United States Patent
Chen et al.

(10) Patent No.: US 11,797,442 B2
(45) Date of Patent: Oct. 24, 2023

(54) INTEGRATED CIRCUIT AND METHOD FOR EXECUTING CACHE MANAGEMENT OPERATION

(71) Applicant: ANDES TECHNOLOGY CORPORATION, Hsinchu (TW)

(72) Inventors: Zhong-Ho Chen, Miaoli County (TW); Yu-Lin Hsiao, Hsinchu (TW); Hsin Ming Chen, Hsinchu (TW)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/503,382

(22) Filed: Oct. 18, 2021

(65) Prior Publication Data
US 2023/0122423 A1 Apr. 20, 2023

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 11,347,512 B1* | 5/2022 | Soong | G06F 9/3836 |
| 2020/0387659 A1 | 12/2020 | Wachs et al. | |
| 2021/0157728 A1* | 5/2021 | Terpstra | G06F 12/1063 |
| 2021/0255942 A1* | 8/2021 | Jung | G11C 13/0004 |
| 2023/0015240 A1* | 1/2023 | Mclellan | G06F 1/266 |

FOREIGN PATENT DOCUMENTS

| | | |
|---|---|---|
| CN | 110083569 | 8/2019 |
| CN | 112988647 | 6/2021 |
| TW | 202127263 | 7/2021 |

OTHER PUBLICATIONS

McMillan (NPL: "Modular Specification and Verification of a Cache-Coherent Interface", 2016 Formal Method in Computer-Aided Design (MCAD), Oct. 2016, pp. 109-116). (Year: 2016).*
Kenneth McMillan, "Modular specification and verification of a cache-coherent interface", 2016 Formal Methods in Computer-Aided Design (FMCAD), Oct. 2016, pp. 109-116.
"Office Action of Taiwan Counterpart Application", dated Oct. 31, 2022, pp. 1-9.

* cited by examiner

*Primary Examiner* — Tracy C Chan
(74) *Attorney, Agent, or Firm* — JCIPRNET (57) ABSTRACT

An integrated circuit and a method for executing a cache management operation are provided. The integrated circuit includes a master interface, a slave interface, and a link. The link is connected between the master interface and the slave interface, and the link includes an A-channel, a B-channel, a C-channel, a D-channel, and an E-channel. The A-channel is configured to transmit a cache management operation message of the master interface to the slave interface, and the cache management operation message is configured to manage data consistency between different data caches. The D-channel is configured to transmit a cache management operation acknowledgement message of the slave interface to the master interface.

18 Claims, 5 Drawing Sheets

INTEGRATED CIRCUIT AND METHOD FOR EXECUTING CACHE MANAGEMENT OPERATION

BACKGROUND

Technical Field

The disclosure relates to an integrated circuit. Particularly, the disclosure relates to a method for executing a cache management operation in an integrated circuit.

Description of Related Art

A system-on-chip (SoC) is a semiconductor technology for integrating a plurality of complex multifunctional systems into one single chip. Silicon intellectual properties (IP) configured in the SoC may be connected to each other through an interconnect bus. TileLink, for example, is an interconnect bus designed for the SoC. Through the interconnect bus compliant with the TileLink protocol, L1-caches (e.g., data caches) of different cores may be connected to an L2-cache. Regardless, a core cannot manage data consistency between different data caches of other cores through the TileLink interconnect bus.

SUMMARY

The disclosure provides an integrated circuit and a method for executing a cache management operation (CMO), in which a master interface (e.g., a master interface of a first core) can execute the cache management operation on data caches of other cores.

In an embodiment of the disclosure, the integrated circuit includes a link and a master interface. The link is connected between the master interface and a slave interface, and the link includes an A-channel, a B-channel, a C-channel, a D-channel, and an E-channel. The method for executing a cache management operation includes the following. An AcquireBlock message compliant with a TileLink protocol is sent from the master interface through the A-channel to the slave interface. A GrantData message or a Grant message compliant with the TileLink protocol sent by the slave interface is received by the master interface through the D-channel. A GrantAck message compliant with the TileLink protocol is sent from the master interface through the E-channel to the slave interface. A ReleaseData message or a Release message compliant with a TileLink protocol is sent from the master interface through the C-channel to the slave interface. A ReleaseAck message compliant with the TileLink protocol sent by the slave interface is received by the master interface through the D-channel. A ProbeBlock message or a ProbePerm message compliant with a TileLink protocol sent by the slave interface is received by the master interface through the B-channel. a ProbeAckData message or a ProbeAck message compliant with the TileLink protocol is sent from the master interface through the C-channel to the slave interface. A cache management operation message is sent from the master interface through the A-channel to the slave interface. The cache management operation message is configured to manage data consistency between different data caches. A cache management operation acknowledgement message of the slave interface is received by the master interface through the D-channel. Wherein, the cache management operation message and the cache management operation acknowledgement message are unstandardized messages to a TileLink specification.

In an embodiment of the disclosure, the integrated circuit includes a master interface, a slave interface, and a link. The link is connected between the master interface and the slave interface. The link includes an A-channel, a B-channel, a C-channel, a D-channel, and an E-channel. The A-channel is configured to transmit an AcquireBlock message compliant with the TileLink protocol sent by the master interface to the slave interface. The D-channel is configured to transmit a GrantData message or a Grant message compliant with the TileLink protocol sent by the slave interface to the master interface. The E-channel is configured to transmit a GrantAck message compliant with the TileLink protocol sent by the master interface to the slave interface. The C-channel is configured to transmit a ReleaseData message or a Release message compliant with the TileLink protocol sent by the master interface to the slave interface. The D-channel is further configured to transmit a ReleaseAck message compliant with the TileLink protocol sent by the slave interface to the master interface. The B-channel is configured to transmit a ProbeBlock message or a ProbePerm message compliant with the TileLink protocol sent by the slave interface to the master interface. The C-channel is further configured to transmit a ProbeAckData message or a ProbeAck message compliant with the TileLink protocol sent by the master interface to the slave interface. The A-channel is further configured to transmit a cache management operation message of the master interface to the slave interface, and the cache management operation message is configured to manage data consistency between different data caches. The D-channel is further configured to transmit a cache management operation acknowledgement message of the slave interface to the master interface. The cache management operation message and the cache management operation acknowledgement message are unstandardized messages to a TileLink specification.

Based on the foregoing, in some embodiments, a first core of the integrated circuit may send the cache management operation message to the L2-cache through the A-channel compliant with the TileLink protocol. The L2-cache may execute the cache management operation message from the first core, and, in response to the execution of the cache management operation message, may send a probe message (e.g., a ProbeBlock message or a ProbePerm message) to other cores (a second core), thus managing data consistency between all L1-caches (e.g., data caches of the first core and the second core). Therefore, the first core may execute the cache management operation on the data caches of the other cores by sending the cache management operation message.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The term "coupling (or connection)" used throughout the whole specification of the present application (including the appended claims) may refer to any direct or indirect connection means. For example, if it is herein described that a first device is coupled (or connected) to a second device, it should be interpreted that the first device may be directly connected to the second device, or the first device may be indirectly connected through other devices or some connection means to the second device. The terms "first", "second", and similar terms mentioned throughout the whole specification of the present application (including the appended claims) are merely used to name discrete elements or to differentiate among different embodiments or ranges, instead of limiting an upper bound or lower bound of the number of elements or the sequence of elements. In addition, wherever possible, elements/components/steps using the same reference numerals in the drawings and the embodiments indicate the same or similar parts. Cross-reference may be mutually made between relevant descriptions of elements/components/steps using the same reference numerals or the same terms in different embodiments.

Figure 1:
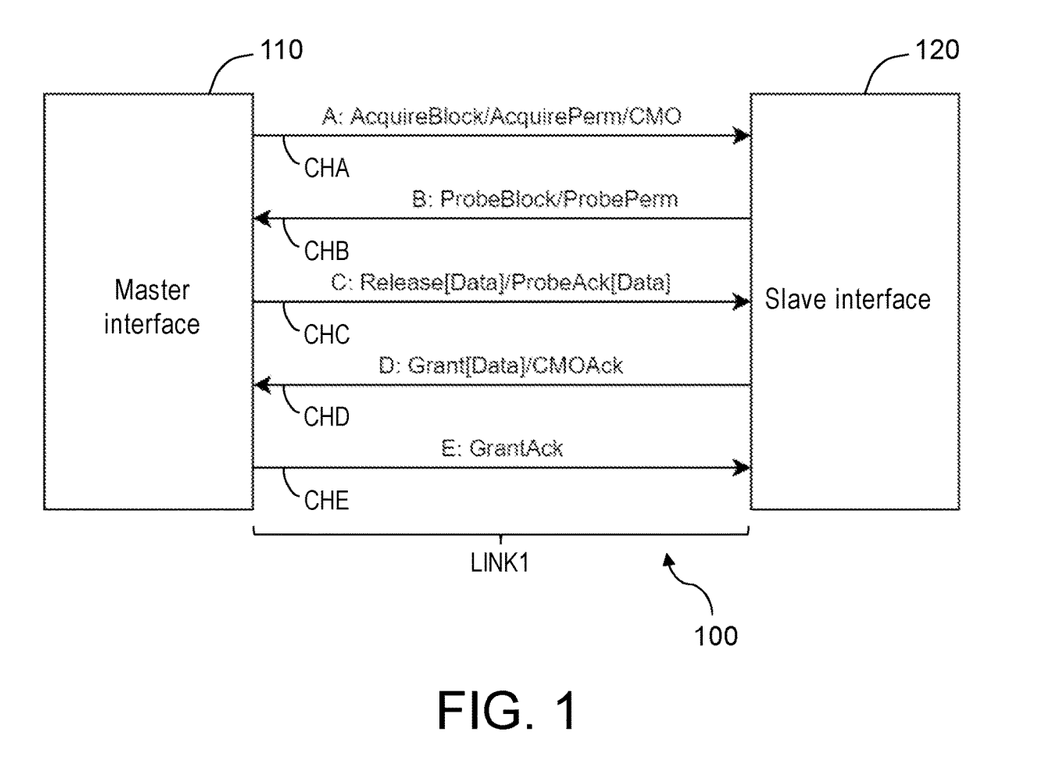
FIG. 1 is a schematic circuit block diagram of an integrated circuit according to an embodiment of the disclosure.

FIG. 1 is a schematic circuit block diagram of an integrated circuit 100 according to an embodiment of the disclosure. The integrated circuit 100 shown in FIG. 1 includes a master interface 110, a slave interface 120, and a link LINK1. The link LINK1 is connected between the master interface 110 and the slave interface 120. In the embodiment shown in FIG. 1, the link LINK1 includes an A-channel CHA, a B-channel CHB, a C-channel CHC, a D-channel CHD, and an E-channel CHE. Wherein, the A-channel CHA, the B-channel CHB, the C-channel CHC, the D-channel CHD, and the E-channel CHE are link channels that comply with the TileLink specification. TileLink is a well-known technical specification, and will not be repeatedly described herein.

The master interface 110 may send a message compliant with a TileLink protocol to the slave interface 120 through the A-channel CHA, the C-channel CHC, and/or the E-channel CHE. The slave interface 120 may transmit a message compliant with the TileLink protocol to the master interface 110 through the B-channel CHB and/or the D-channel CHD. For example, the master interface 110 may send an AcquireBlock message compliant with the TileLink protocol to the slave interface 120 through the A-channel CHA. Then, the master interface 110 may receive a GrantData message (or a Grant message) compliant with the TileLink protocol sent by the slave interface 120 through the D-channel CHD. Then, the master interface 110 may send a GrantAck message compliant with the TileLink protocol to the slave interface 120 through the E-channel CHE. For another example, the master interface 110 may send a ReleaseData message (or a Release message) compliant with the TileLink protocol to the slave interface 120 through the C-channel CHC. Then, the master interface 110 may receive a ReleaseAck message compliant with the TileLink protocol sent by the slave interface 120 through the D-channel CHD. For still another example, the master interface 110 may receive a ProbeBlock message (or a ProbePerm message) compliant with the TileLink protocol sent by the slave interface 120 through the B-channel CHB. Then, the master interface 110 may send a ProbeAckData message (or a ProbeAck message) compliant with the TileLink protocol to the slave interface 120 through the C-channel CHC.

The AcquireBlock message, the GrantData message, the Grant message, the GrantAck message, the ReleaseData message, the Release message, the ReleaseAck message, the ProbeBlock message, the ProbePerm message, the ProbeAckData message, and the ProbeAck message are each a message defined in the TileLink protocol, and will not be repeatedly described herein. In addition, the difference from the TileLink protocol lies in that, the A-channel CHA may transmit a cache management operation message (hereinafter CMO message) of the master interface 110 to the slave interface 120, and the D-channel CHD may transmit a cache management operation acknowledgement message (hereinafter CMOAck message) of the slave interface 120 to the master interface 110. The CMO message and the CMOAck message are custom messages (unstandardized messages to the TileLink specification).

The master interface 110, the slave interface 120, and the link LINK1 shown in FIG. 1 may be applied to any transmission interface of the integrated circuit 100. For example, in some embodiments, the master interface 110 may be configured in a data cache (an L1-cache) of any one of a plurality of cores of the integrated circuit 100, and the slave interface 120 may be configured in an L2-cache of the integrated circuit 100. The CMO message is configured to manage data consistency between different data caches of different cores. For example, one of the cores (a first core, not shown in FIG. 1) of the integrated circuit 100 may change a permission of a cache line of the data cache of another (or more) of the cores (a second core, not shown in FIG. 1) by sending the CMO message to manage the data consistency between different data caches.

Figure 2:
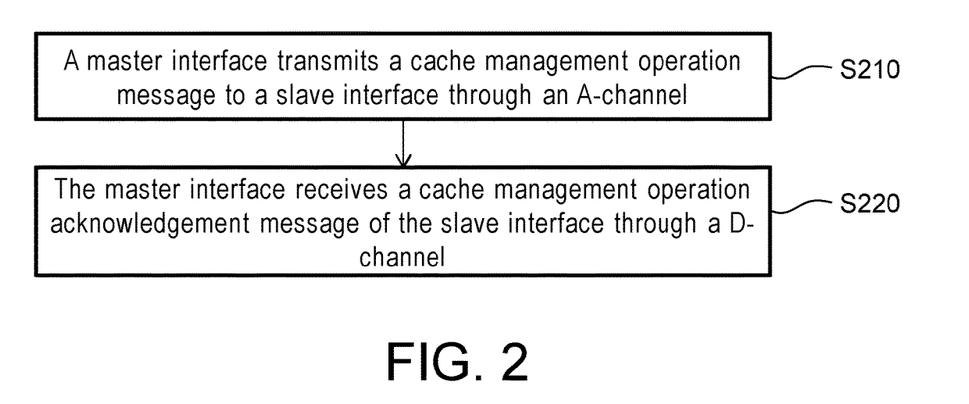
FIG. 2 is a schematic flowchart illustrating a method for executing a cache management operation in an integrated circuit according to an embodiment of the disclosure.

FIG. 2 is a schematic flowchart illustrating a method for executing a cache management operation in an integrated circuit according to an embodiment of the disclosure. With reference to FIG. 1 and FIG. 2, in step S210, the master interface 110 may send a CMO message to the slave interface 120 through the A-channel CHA. In step S220, the master interface 110 may receive a CMOAck message returned by the slave interface 120 through the D-channel CHD.

Figure 3:
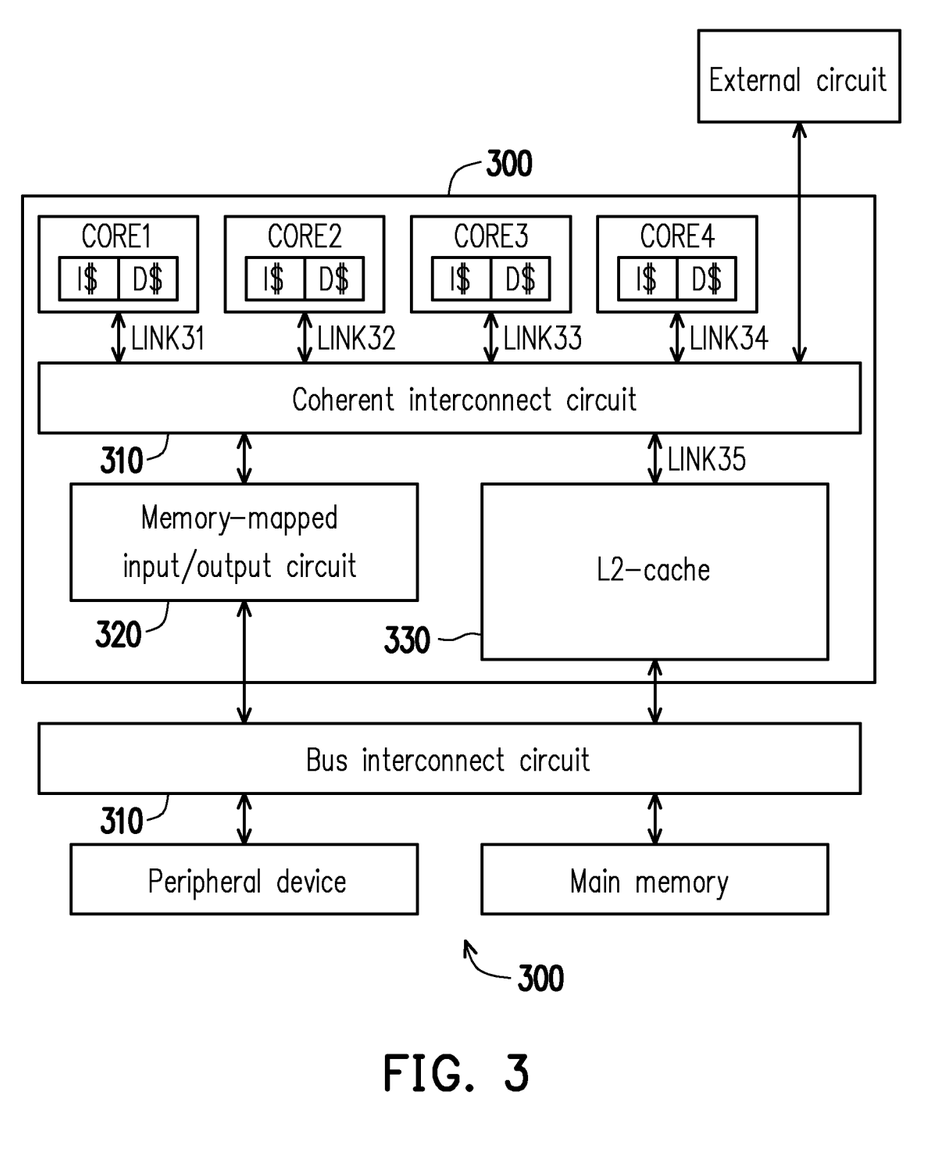
FIG. 3 is a schematic circuit block diagram of an integrated circuit according to an embodiment.

FIG. 3 is a schematic circuit block diagram of an integrated circuit 300 according to an embodiment. Depending on the actual design, reference may be made to the relevant description of the integrated circuit 100 shown in FIG. 1 for the integrated circuit 300 shown in FIG. 3, and (or) reference may be made to the relevant description of the integrated circuit 300 shown in FIG. 3 for the integrated circuit 100 shown in FIG. 1. In the embodiment shown in FIG. 3, the integrated circuit 300 includes a plurality of cores, for example, a core CORE1, a core CORE2, a core CORE3, and a core CORE4 shown in FIG. 3. The symbol "I$" shown in FIG. 3 denotes an instruction cache, and the symbol "D$" shown in FIG. 3 denotes a data cache. The data caches D$ of the cores CORE1 to CORE4 may be regarded as L1-caches.

The integrated circuit 300 also includes a coherent interconnect circuit 310, a memory-mapped input/output (MMIO) circuit 320, and an L2-cache 330. Depending on the actual design, the MMIO circuit 320 may be any MMIO circuit, for example, a conventional MMIO circuit or other MMIO circuits.

The coherent interconnect circuit 310 is connected to the data caches D$ of the cores CORE1 to CORE4 through links LINK31, LINK32, LINK33, and LINK34. The coherent interconnect circuit 310 is also connected to the L2-cache 330 through a link LINK35. Depending on the actual design, the coherent interconnect circuit 310 may be any interconnection circuit, for example, a conventional interconnection circuit or other interconnection circuits. For any one of the links LINK31 to LINK35, reference may be made to the relevant description of the link LINK1 shown in FIG. 1, which will not be repeated. One of the cores (e.g., the core CORE1) of integrated circuit 300 may change a permission of a cache line of the data caches D$ of the other cores (e.g., the cores CORE2 to CORE4) of integrated circuit 300 by sending a CMO message to manage data consistency between the different data caches D$.

During the actual operation, any one of the cores CORE1 to CORE4 may execute a cache management operation instruction. The cache management operation instruction may manage the data consistency between different data caches D$. The syntax of the cache management operation instruction is not limited by this embodiment. For example, the cache management operation instruction may include a pseudocode as described below, where "L" is a label, "CMO.VAR." denotes a cache management operation, "cmo_specifier" denotes an operation category, "rd" denotes a destination register (which is configured to store a cache line address), "rs1" denotes a source register (which is configured to store a current cache line addres), "rs2" denotes a boundary register (which is configured to storage a completion cache line address), and "bne" denotes a branch or a jump, that is, before the address of rd reaches the address of rs2, return to label "L" to continue the execution. Therefore, for the cache lines within a specified range (from the cache line address stored in the register rs1 to the cache line address stored in the register rs2) in different data caches D$, the cache management operation instruction may manage the data consistency of one cache line or between more cache lines within the specified range.

L: CMO.VAR.<cmo_specifier>rd,rs1,rs2
   bne rd,rs2,L

Based on the operation category "cmo_specifier", the cache management operation instruction may perform at least one of a write-back and an invalidation on at least one cache line of each of the different data caches D$ of different cores. The operation category "cmo_specifier" may be defined depending on the actual design. For example, the operation category "cmo_specifier" may be "INVAL" (invalidating operation type), "WBINVAL" (write-back and invalidating operation type), or "WB" (write-back operation type). When the operation category "cmo_specifier" is "INVAL", the cache management operation instruction may invalidate one or more cache lines within the specified range. When the operation category "cmo_specifier" is "WBINVAL", the cache management operation instruction may write one or more cache lines within the specified range back to the L2-cache 330, and then invalidate the cache lines within the specified range. When the operation category "cmo_specifier" is "WB", the cache management operation instruction may write one or more cache lines within the specified range back to the L2-cache 330.

For example, the core CORE1 may execute the cache management operation instruction. In response to the execution of the cache management operation instruction, the core CORE1 may send a CMO message from a master interface of the data cache D$ of the core CORE1 to a slave interface of the coherent interconnect circuit 310. The coherent interconnect circuit 310 may forward the CMO message sent by the core CORE1 to a slave interface of the L2-cache 330. Based on the CMO message sent by the core CORE1, the L2-cache 330 may change the permission of the corresponding cache line of the data caches D$ of the cores CORE2 to CORE4 to manage the data consistency between the different data caches D$.

To be specific, assuming that the core CORE1 executes the cache management operation instruction, then the core CORE1 may not only manage data consistency of the data cache D$ of the core CORE1, but may also manage data consistency between the data caches D$ of the other cores (e.g., the cores CORE2 to CORE4). Regarding the core CORE1 managing the data consistency of the data cache D$ of the core CORE1, the details will be described with reference to FIG. 5. Regarding the core CORE1 managing the data consistency between the data caches D$ of the other cores, the details will be described with reference to FIG. 5.

Figure 4:
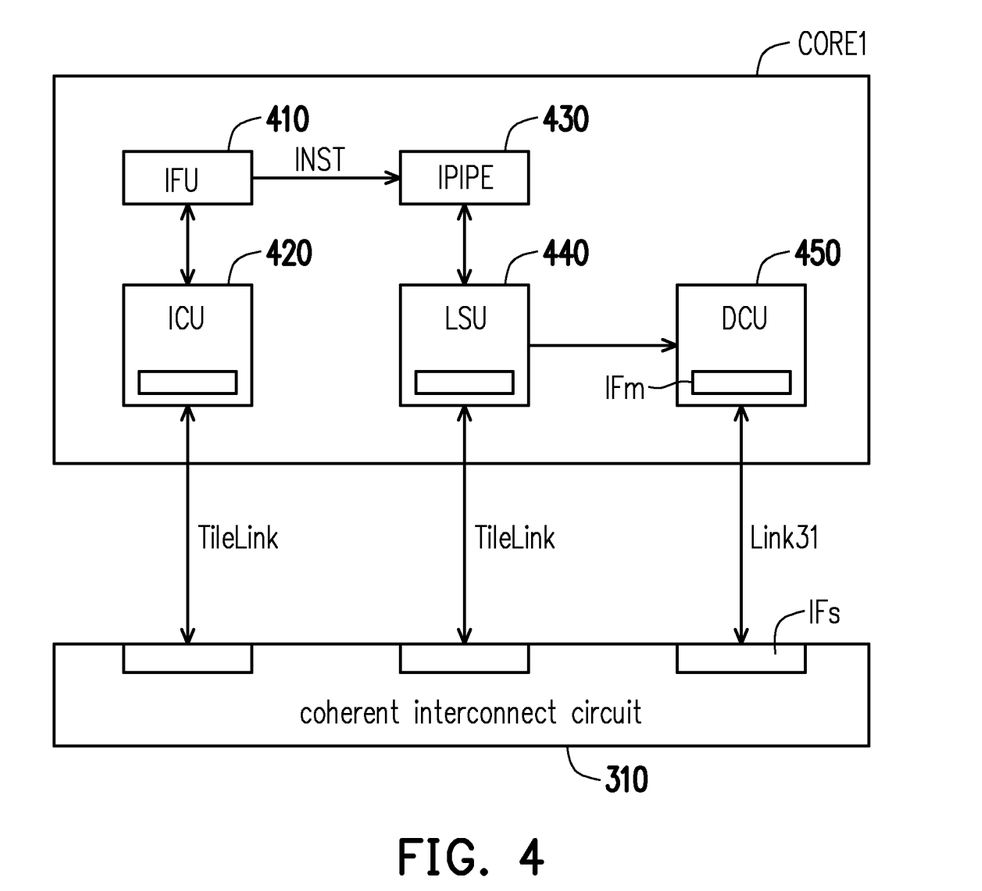
FIG. 4 is a schematic circuit block diagram of the core according to an embodiment of the disclosure.

FIG. 4 is a schematic circuit block diagram of the core CORE1 shown in FIG. 3 according to an embodiment of the disclosure. The core CORE2, the core CORE3, and the core CORE4 shown in FIG. 3 may be deduced by analogy with reference to the relevant descriptions of the core CORE1 shown in FIG. 4, will not be repeated. The core CORE1 shown in FIG. 4 includes an instruction fetch unit (IFU) 410, an instruction cache unit (ICU) 420, an instruction pipeline (IPIPE) 430, a load/store unit unit (LSU) 440 and a data cache unit (DCU) 450. The IFU 410 sends a fetch request to the ICU 420. The ICU 420 may forward the fetch request to the coherent interconnect circuit 310 through a link that comply with the TileLink specification, so as to fetch the instruction. The IFU 410 sends the fetched instruction INST to the IPIPE 430. The IPIPE 430 decodes and executes the fetched instruction INST. When the the fetched instruction INST is a memory access instruction, the IPIPE 430 sends a load/store request to the LSU 440.

When the load/store request is a non-cacheable request, the LSU 440 may forward the non-cacheable request to the coherent interconnect circuit 310 through a link that comply with the TileLink specification, so as to fetch data. When the load/store request is a cacheable request, the LSU 440 may send the cacheable request to the DCU 450. The DCU 450 can forward the cacheable request to the coherent interconnect circuit 310 through the link LINK31, so as to fetch data. In detail, the master interface IFm of the DCU 450 sends the cacheable request to the slave interface IFs of the coherent interconnect circuit 310, and then the slave interface IFs of the coherent interconnect circuit 310 returns the data to the master interface IFm of the DCU 450. The master interface IFm, link LINK31, and slave interface IFs shown in FIG. 4 can be deduced by analogy with reference to the related descriptions of the master interface 110, link LINK1, and slave interface 120 shown in FIG. 1.

Figure 5:
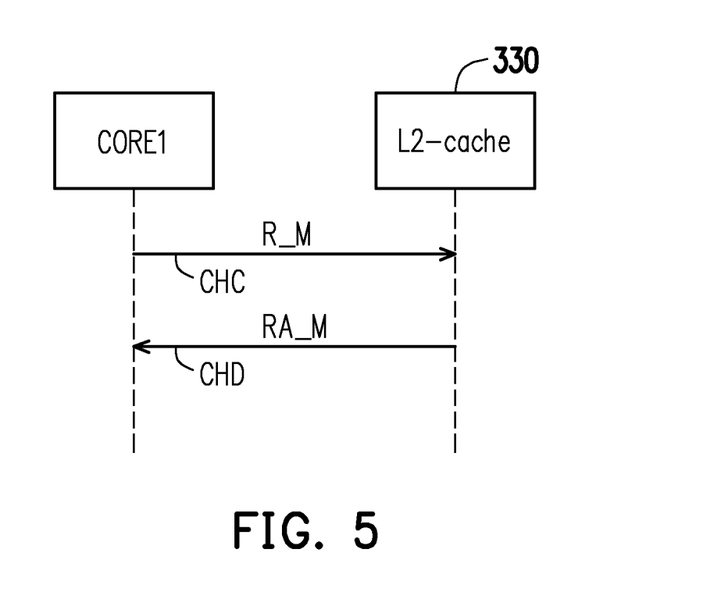
FIG. 5 is a schematic diagram illustrating an operation of a core managing data consistency of a data cache of the core according to an embodiment.

FIG. 5 is a schematic diagram illustrating an operation of a core CORE1 managing data consistency of a data cache D$ of the core CORE1 according to an embodiment. The vertical axis shown in FIG. 4 represents time. With reference to FIG. 3 and FIG. 5, assuming that the core CORE1 executes the cache management operation instruction, then the master interface of the data cache D$ of the core CORE1 may send a release message R_M to the slave interface of the L2-cache 330 through the C-channel CHC. By sending the release message R_M, the data cache D$ of the core CORE1 may downgrade a permission of a target cache line of the data cache D$ of the core CORE1. Therefore, the core CORE1 may manage the data consistency of the data cache D$ of the core CORE1.

For example, it is assumed that the operation category cmo_specifier of the cache management operation instruction is "WBINVAL". When the state of the target cache line is an "M state" (Modified state, i.e., the target cache line is only present in the data cache D$ of the core CORE1, and the target cache line is dirty), the release message R_M shown in FIG. 5 may be a ReleaseData message compliant with the TileLink protocol. Therefore, the core CORE1 may write the dirty data of the target cache line back to the L2-cache 330 and downgrade a permission of the target cache line from a "T" permission (Tip permission, i.e., a master interface has a copy of the content of the target cache line, and the master interface has a read and write permission to the target cache line) to an "N" permission (Nothing permission, i.e., a master interface has no target cache line). Based on the ReleaseData message, the state of the target cache line is converted from the "M state" to an "I state" (Invalid state, i.e., the target cache line is not present in the data cache D$ of the core CORE1). When the state of the target cache line is an "E state" (Exclusive state, i.e., the target cache line is only present in the data cache D$ of the core CORE1, and the target cache line is clean), the release message R_M shown in FIG. 5 may be a Release message compliant with the TileLink protocol. Therefore, the core CORE1 may downgrade the permission of the target cache line from the "T" permission to the "N" permission. Based on the Release message, the state of the target cache line is converted from the "E state" to the "I state". When the state of the target cache line is an "S state" (Shared state, i.e., the target cache line is present in the data cache D$ of the core CORE1, and the target cache line may be shared with the data caches D$ of the other cores), the release message R_M shown in FIG. 5 may be a Release message. Therefore, the core CORE1 may downgrade the permission of the target cache line from a "B" permission (Branch permission, i.e., a master interface has a copy of the content of the target cache line, and the master interface has a read-only permission to the target cache line) to the "N" permission. Based on the Release message, the state of the target cache line is converted from the "S state" to the "I state". The "M state", the "E state", the "S state" and the "I state" are 4 states regulated by the well-known MESI protocol, which will not be repeated. The "N" permission, the "B" permission and the "T" permission are 3 well-known definitions of cache line permission, which will not be repeated.

For another example, it is assumed that the operation category cmo_specifier of the cache management operation instruction is "INVAL". When the state of the target cache line is the "M state", the release message R_M shown in FIG. 5 may be a Release message compliant with the TileLink protocol. Therefore, the core CORE1 may downgrade the permission of the target cache line from the "T" permission to the "N" permission. Based on the Release message, the state of the target cache line is converted from the "M state" to the "I state". When the state of the target cache line is the "E state", the release message R_M shown in FIG. 5 may be a Release message. Therefore, the core CORE1 may downgrade the permission of the target cache line from the "T" permission to the "N" permission. Based on the Release message, the state of the target cache line is converted from the "E state" to the "I state". When the state of the target cache line is the "S state", the release message R_M shown in FIG. 4 may be a Release message. Therefore, the core CORE1 may downgrade the permission of the target cache line from the "B" permission to the "N" permission. Based on the Release message, the state of the target cache line is converted from the "S state" to the "I state".

For still another example, it is assumed that the operation category cmo_specifier of the cache management operation instruction is "WB". When the state of the target cache line is the "M state", the release message R_M shown in FIG. 5 may be a ReleaseData message compliant with the TileLink protocol. Therefore, the core CORE1 may write the dirty data of the target cache line back to the L2-cache 330 and downgrades the permission of the target cache line from the "T" permission to the "T" permission (i.e. the permission of the target cache line may be maintained at the "T" permission). Based on the Release message, the state of the target cache line is converted from the "M state" to the "E state".

After the L2-cache 330 completes the execution of the release message R_M, the slave interface of the L2-cache 330 may send a release acknowledgement message RA_M to the master interface of the data cache D$ of the core CORE1 through the D-channel CHD. For example, the release message R_M shown in FIG. 5 may be a ReleaseAck message compliant with the TileLink protocol.

Figure 6:
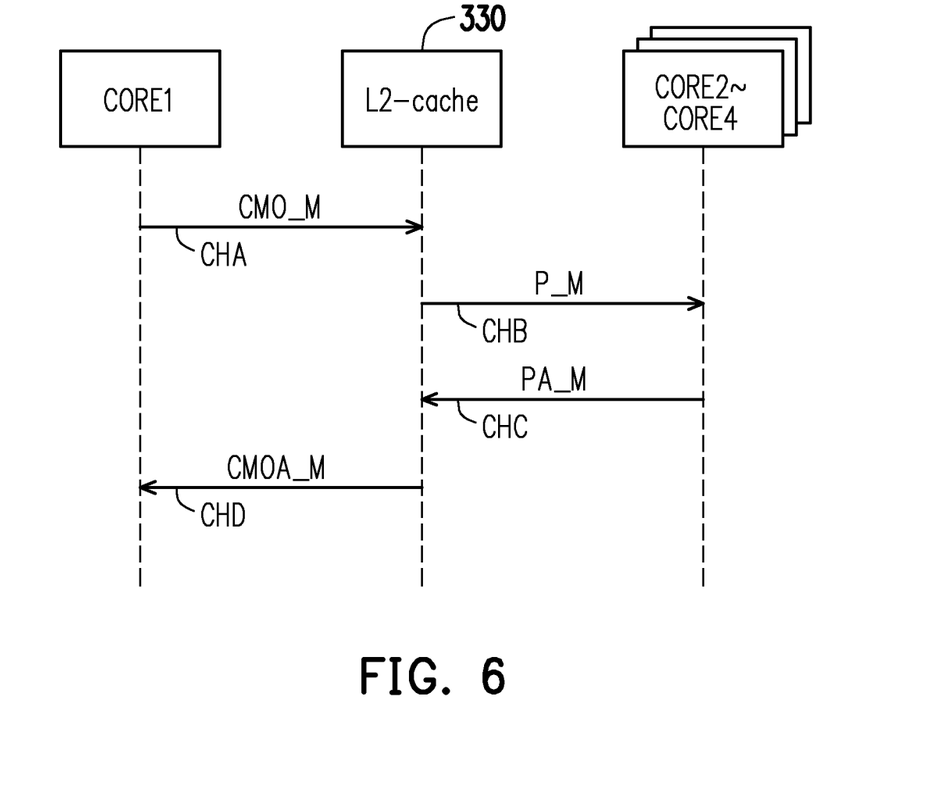
FIG. 6 is a schematic diagram illustrating an operation of a core managing data consistency between data caches of other cores according to an embodiment.

FIG. 6 is a schematic diagram illustrating an operation of a core CORE1 managing data consistency between data caches D$ of other cores according to an embodiment. The vertical axis shown in FIG. 6 represents time. With reference to FIG. 3 and FIG. 6, assuming that the core CORE1 executes the cache management operation instruction, then the master interface of the data cache D$ of the core CORE1 may send a cache management operation (CMO) message CMO_M to the slave interface of the L2-cache 330 through the A-channel CHA. By sending the CMO message CMO_M, the data cache D$ of the core CORE1 may change a permission of the target cache line of the data caches D$ of the other cores (e.g., the cores CORE2 to CORE4) to manage the data consistency between the data caches D$ of the cores CORE1 to CORE4.

To be specific, the L2-cache 330 receives and executes the CMO message CMO_M from the core CORE1. In response to the execution of the CMO message CMO_M, the L2-cache 330 sends a probe message P_M to the data caches D$ of the other cores (e.g., the cores CORE2 to CORE4) through the B-channel CHB to manage the data consistency between the data cache D$ of the core CORE1 and the data caches D$ of the cores CORE2 to CORE4. Depending on the actual operation, the probe message P_M may be the ProbeBlock message or the ProbePerm message compliant with the TileLink protocol. The probe message P_M may change the permission of the target cache line of the data caches D$ of the cores (e.g., cores CORE2 to CORE4). In response to the execution of the probe message P_M, the cores CORE2 to CORE4 return a probe acknowledgement message PA_M to the L2-cache 330 through the C-channel CHC. Based on the probe acknowledgement message PA_M returned by the cores CORE2 to CORE4, the L2-cache 330 may send a CMOAck message CMOA_M to the core CORE1 through the D-channel CHD.

Therefore, the core CORE1 may manage the data consistency between the data caches D$ of the other cores (e.g., the cores CORE2 to CORE4). Hereinafter, description with reference to the protocol shown in FIG. 6 will be provided for specific examples of the core CORE1 changing the permission of the target cache line of the data caches D$ of the other cores CORE2 to CORE4.

For example, it is assumed that the operation category cmo_specifier of the cache management operation instruction is "WBINVAL". When the state of the target cache line is the "M state", the CMO message CMO_M shown in FIG. 6 may be a CMOBlock message (a CMO message with cache data), and the probe message P_M shown in FIG. 6 may be a ProbeBlock message compliant with the TileLink protocol. Therefore, the L2-cache 330 may provide data of the target cache line to the cores CORE2 to CORE4. Based on the ProbeBlock message, the cores CORE2 to CORE4 return a ProbeAckData message (the probe acknowledgement message PA_M) compliant with the TileLink protocol to the L2-cache 330 through the C-channel CHC. Therefore, the permission of the target cache line in the data caches D$ of the cores CORE2 to CORE4 may be downgraded from the "T" permission to the "N" permission. Based on the CMOBlock message, the state of the target cache line is converted from the "M state" to the "I state". When the state of the target cache line is the "E state", the CMO message CMO_M shown in FIG. 6 may be a CMOBlock message, the probe message P_M shown in FIG. 6 may be a ProbeBlock message, and the probe acknowledgement message PA_M shown in FIG. 6 may be a ProbeAck message compliant with the TileLink protocol. Therefore, the permission of the target cache line in the data caches D$ of the cores CORE2 to CORE4 may be downgraded from the "T" permission to the "N" permission. Based on the CMOBlock message, the state of the target cache line is converted from the "E state" to the "I state". When the state of the target cache line is the "S state", the CMO message CMO_M shown in FIG. 6 may be a CMOBlock message, the probe message P_M shown in FIG. 6 may be a ProbeBlock message, and the probe acknowledgement message PA_M shown in FIG. 6 may be a ProbeAck message. Therefore, the permission of the target cache line in the data caches D$ of the cores CORE2 to CORE4 may be downgraded from the "B" permission to the "N" permission. Based on the CMOBlock message, the state of the target cache line is converted from the "S state" to the "I state". When the state of the target cache line is the "I state", the CMO message CMO_M shown in FIG. 6 may be a CMOBlock message, the probe message P_M shown in FIG. 6 may be a ProbeBlock message, and the probe acknowledgement message PA_M shown in FIG. 6 may be a ProbeAck message. Therefore, the permission of the target cache line in the data caches D$ of the cores CORE2 to CORE4 may be maintained at the "N" permission. Based on the CMOBlock message, the state of the target cache line is maintained at the "I state".

For another example, it is assumed that the operation category cmo_specifier of the cache management operation instruction is "INVAL". When the state of the target cache line is the "M state", the CMO message CMO_M shown in FIG. 6 may be a CMOPerm message (a CMO message without cache data), and the probe message P_M shown in FIG. 6 may be a ProbePerm message compliant with the TileLink protocol. Based on the ProbePerm message, the cores CORE2 to CORE4 return a ProbeAck message (the probe acknowledgement message PA_M) compliant with the TileLink protocol to the L2-cache 330 through the C-channel CHC. Therefore, the permission of the target cache line in the data caches D$ of the cores CORE2 to CORE4 may be downgraded from the "T" permission to the "N" permission. Based on the CMOPerm message, the state of the target cache line is converted from the "M state" to the "I state". When the state of the target cache line is the "E state", the CMO message CMO_M shown in FIG. 6 may be a CMOPerm message, the probe message P_M shown in FIG. 6 may be a ProbePerm message, and the probe acknowledgement message PA_M shown in FIG. 6 may be a ProbeAck message. Therefore, the permission of the target cache line in the data caches D$ of the cores CORE2 to CORE4 may be downgraded from the "T" permission to the "N" permission. Based on the CMOPerm message, the state of the target cache line is converted from the "E state" to the "I state". When the state of the target cache line is the "S state", the CMO message CMO_M shown in FIG. 6 may be a CMOPerm message, the probe message P_M shown in FIG. 6 may be a ProbePerm message, and the probe acknowledgement message PA_M shown in FIG. 6 may be a ProbeAck message. Therefore, the permission of the target cache line in the data caches D$ of the cores CORE2 to CORE4 may be downgraded from the "B" permission to the "N" permission. Based on the CMOPerm message, the state of the target cache line is converted from the "S state" to the "I state". When the state of the target cache line is the "I state", the CMO message CMO_M shown in FIG. 6 may be a CMOPerm message, the probe message P_M shown in FIG. 6 may be a ProbePerm message, and the probe acknowledgement message PA_M shown in FIG. 6 may be a ProbeAck message. Therefore, the permission of the target cache line in the data caches D$ of the cores CORE2 to CORE4 may be maintained at the "N" permission. Based on the CMOPerm message, the state of the target cache line is maintained at the "I state".

For still another example, it is assumed that the operation category cmo_specifier of the cache management operation instruction is "WB". When the state of the target cache line is the "M state", the CMO message CMO_M shown in FIG. 6 may be a CMOBlock message, the probe message P_M shown in FIG. 6 may be a ProbeBlock message compliant with the TileLink protocol, and the probe acknowledgement message PA_M shown in FIG. 6 may be a ProbeAckData message compliant with the TileLink protocol. Therefore, the permission of the target cache line in the data caches D$ of the cores CORE2 to CORE4 may be maintained at the "T" permission. Based on the CMOBlock message, the state of the target cache line is converted from the "M state" to the "E state". When the state of the target cache line is the "E state", the CMO message CMO_M shown in FIG. 6 may be a CMOBlock message, the probe message P_M shown in FIG. 6 may be a ProbeBlock message, and the probe acknowledgement message PA_M shown in FIG. 6 may be a ProbeAck message compliant with the TileLink protocol. Therefore, the permission of the target cache line in the data caches D$ of the cores CORE2 to CORE4 may be maintained at "T". Based on the CMOBlock message, the state of the target cache line is maintained at the "E state". When the state of the target cache line is the "S state", the CMO message CMO_M shown in FIG. 6 may be a CMOBlock message, the probe message P_M shown in FIG. 6 may be a ProbeBlock message, and the probe acknowledgement message PA_M shown in FIG. 6 may be a ProbeAck message. Therefore, the permission of the target cache line in the data caches D$ of the cores CORE2 to CORE4 may be maintained at "B". Based on the CMOBlock message, the state of the target cache line is maintained at the "S state". When the state of the target cache line is the "I state", the CMO message CMO_M shown in FIG. 6 may be a CMOBlock message, the probe message P_M shown in FIG. 6 may be a ProbeBlock message, and the probe acknowledgement message PA_M shown in FIG. 6 may be a ProbeAck message. Therefore, the permission of the target cache line in the data caches D$ of the cores CORE2 to CORE4 may be maintained at the "N" permission. Based on the CMO-Block message, the state of the target cache line is maintained at the "I state".

In summary of the foregoing, as described in above embodiments, the first core (e.g., the core CORE1) of the integrated circuit 300 may send the CMO message CMO_M not belonging to the TileLink protocol to the L2-cache 330 through the A-channel compliant with the TileLink protocol. The L2-cache 330 may execute the CMO message CMO_M from the first core, and, in response to the execution of the CMO message CMO_M, may send a probe message (e.g., a ProbeBlock message or a ProbePerm message) to the other cores (the second core, e.g., the cores CORE2 to CORE4), thus managing the data consistency between all of the L1-caches (e.g., the data caches D$ of the cores CORE1 to CORE4). Therefore, any one of the cores CORE1 to CORE4 may execute the cache management operation on the data caches $ of the other cores by sending the CMO message CMO_M.

Figure 7:
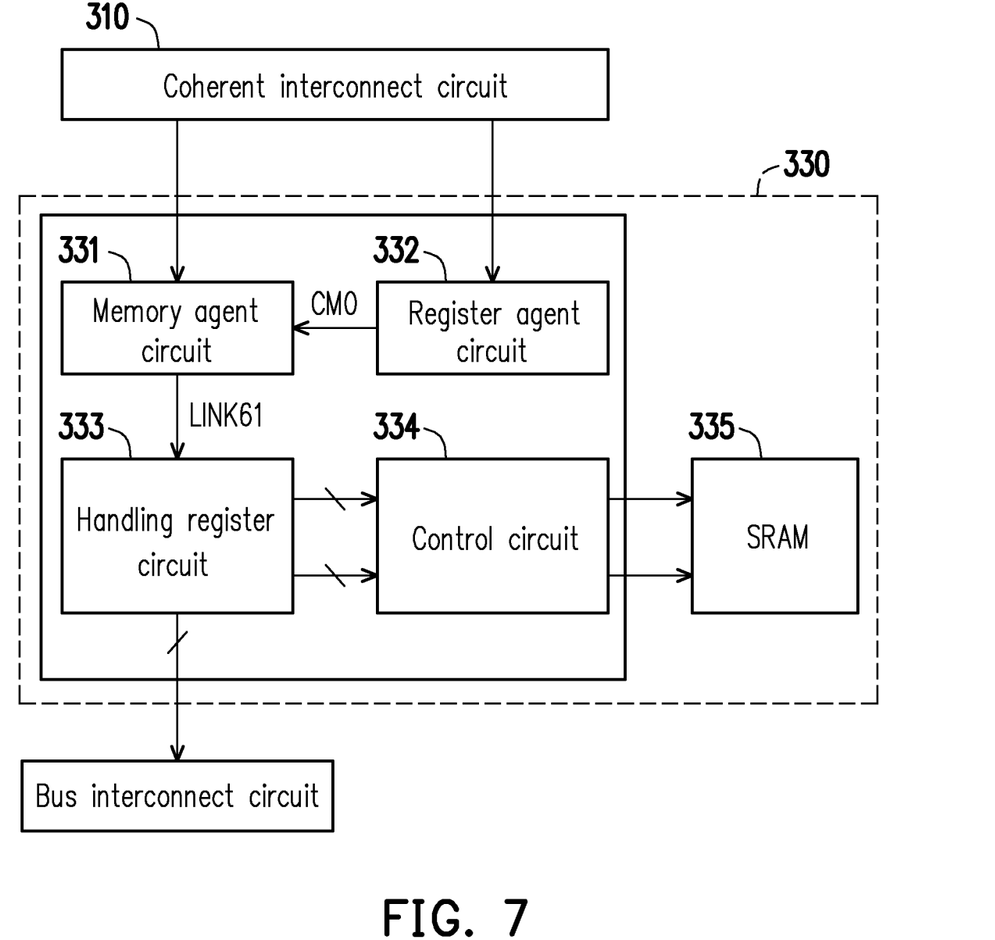
FIG. 7 is a schematic circuit block diagram of an L2-cache circuit according to an embodiment.

The link LINK1 shown in FIG. 1 is not limited to the links LINK31 to LINK35 shown in FIG. 3. Depending on the actual design, in some embodiments, the link LINK1 shown in FIG. 1 may be applied to the internal circuit of the L2-cache 330. For example, FIG. 7 is a schematic circuit block diagram of an L2-cache circuit 330 according to an embodiment. With reference to FIG. 3 and FIG. 7, the L2-cache 330 shown in FIG. 7 includes a memory agent circuit 331, a register agent circuit 332, a handling register circuit 333, a control circuit 334, and a static random access memory (SRAM) 335.

Any one of the cores CORE1 to CORE4 may transmit any message defined in the TileLink protocol to the memory agent circuit 331 through the coherent interconnect circuit 310. The master interface of the memory agent circuit 331 may transmit the message defined in the TileLink protocol to the slave interface of the handling register circuit 333 through a link LINK61. For the link LINK61, reference may be made to the relevant description of the link LINK1 shown in FIG. 1, which will not be repeated.

The register agent circuit 332 has a plurality of registers. For example, depending on the actual design, the register agent circuit 332 has a command register and an access line register corresponding to each of the cores CORE1 to CORE4. Any one of the command registers is configured to record a command issued by one corresponding core, and the access line register is configured to record an address/index of a target cache line sent by a corresponding core. In addition, depending on the actual design, the register agent circuit 332 may also be configured with a cache control state register. Based on the contents of the registers, the register agent circuit 332 may generate a CMO message to the memory agent circuit 331. The master interface of the memory agent circuit 331 may forward the CMO message to the slave interface of the handling register circuit 333 through the link LINK61. The CMO message may be deduced by analogy with reference to the relevant descriptions in the above embodiments, will not be repeated.

The handling register circuit 333 is also referred to as a handling register file (HRF). The handling register circuit 333 may notify the control circuit 334 to execute a corresponding operation according to the message of the link LINK61, thus accessing the SRAM 335. For example, the link LINK61 may transmit the message defined in the TileLink protocol to the handling register circuit 333, and the handling register circuit 333 may execute the TileLink message and access the SRAM 335 through the control circuit 334. When the register agent circuit 332 transmits the CMO message to the handling register circuit 333 through the memory agent circuit 331 and the link LINK61, the handling register circuit 333 may change a permission of a cache line of the SRAM 335 in response to the execution of the CMO message to manage data consistency between the data caches D$ of the cores CORE1 to CORE4 and SRAM 335.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for executing a cache management operation in an integrated circuit, the integrated circuit comprises an L2-cache, a plurality of cores and a coherent interconnect circuit, the L2-cache comprises a memory agent circuit, a register agent circuit, a handling register circuit, a link and a static random access memory, the memory agent circuit comprises a master interface, the handling register circuit comprises a slave interface, the link is connected between the master interface and the slave interface, the link comprises an A-channel, a B-channel, a C-channel, a D-channel, and an E-channel, and the method comprises:
   sending an AcquireBlock message compliant with a TileLink protocol from the master interface through the A-channel to the slave interface;
   receiving, by the master interface through the D-channel, a GrantData message or a Grant message compliant with the TileLink protocol sent by the slave interface;
   sending a GrantAck message compliant with the TileLink protocol from the master interface through the E-channel to the slave interface;
   sending a ReleaseData message or a Release message compliant with the TileLink protocol from the master interface through the C-channel to the slave interface;
   receiving, by the master interface through the D-channel, a ReleaseAck message compliant with the TileLink protocol sent by the slave interface;
   receiving, by the master interface through the B-channel, a ProbeBlock message or a ProbePerm message compliant with the TileLink protocol sent by the slave interface;
   sending a ProbeAckData message or a ProbeAck message compliant with the TileLink protocol from the master interface through the C-channel to the slave interface;
   sending a cache management operation message from the master interface through the A-channel to the slave interface, wherein the cache management operation message is configured to manage data consistency between different data caches;
   receiving, by the master interface through the D-channel, a cache management operation acknowledgement message of the slave interface, wherein the cache management operation message and the cache management operation acknowledgement message are unstandardized messages to a TileLink specification;
   sending, by one of the plurality of cores, a message defined in the TileLink protocol to the memory agent circuit through the coherent interconnect circuit;
   sending the message through the link to the slave interface of the handling register circuit by the master interface of the memory agent circuit;
   generating the cache management operation message to the memory agent circuit by the register agent circuit;

forwarding the cache management operation message to the slave interface of the handling register circuit through the link by the master interface of the memory agent circuit; and changing, by the handling register circuit, a permission of a cache line of the static random access memory in response to the execution of the cache management operation message to manage data consistency between the static random access memory and a data caches of each of the cores.

2. The method according to claim 1, wherein the integrated circuit further comprises a first core, and the method further comprises:

executing a cache management operation instruction by the first core, wherein the cache management operation instruction is configured to manage data consistency between different data caches; and in response to the execution of the cache management operation instruction, sending the cache management operation message from the master interface of the first core to the slave interface of the L2-cache.

3. The method according to claim 2, wherein the cache management operation instruction is configured to perform at least one of a write-back and an invalidation on at least one cache line of each of different data caches of different cores.

4. The method according to claim 1, further comprising:

receiving and executing, by the L2-cache, the cache management operation message from a first core;

sending, by the L2-cache in response to the execution of the cache management operation message, the ProbeBlock message or the ProbePerm message to at least one second core to manage data consistency between a data cache of the first core and at least one data cache of the at least one second core;

receiving the ProbeAckData message or the ProbeAck message by the L2-cache from the at least one second core;

sending the cache management operation acknowledgement message by the L2-cache to the first core;

executing a cache management operation instruction by the first core; and sending a cache management operation message to the slave interface of the L2-cache through the A-channel by the master interface of a data cache of the first core, so as to change a permission of a target cache line of the at least one data cache of the at least one second core.

5. The method according to claim 4, wherein the cache management operation message is a CMOBlock message, the L2-cache sends the ProbeBlock message to the at least one second core in response to the execution of the cache management operation message.

6. The method according to claim 4, wherein the cache management operation message is a CMOPerm message, the L2-cache sends the ProbePerm message to the at least one second core in response to the execution of the cache management operation message.

7. The method according to claim 4, wherein an operation category of the cache management operation instruction is a write-back and invalidating operation type.

8. The method according to claim 4, wherein an operation category of the cache management operation instruction is an invalidating operation type.

9. The method according to claim 4, wherein an operation category of the cache management operation instruction is a write-back operation type.

10. An integrated circuit, comprising:
a plurality of cores;
a coherent interconnect circuit; and
an L2-cache, comprising a memory agent circuit, a register agent circuit, a handling register circuit, a link and a static random access memory, wherein the memory agent circuit comprises a master interface, the handling register circuit comprises a slave interface, one of the plurality of cores transmits a message defined in the TileLink protocol to the memory agent circuit through the coherent interconnect circuit, the master interface of the memory agent circuit transmits the message through the link to the slave interface of the handling register circuit, the register agent circuit generates the cache management operation message to the memory agent circuit, the master interface of the memory agent circuit forwards the cache management operation message to the slave interface of the handling register circuit through the link, and the handling register circuit changes a permission of a cache line of the static random access memory in response to the execution of the cache management operation message to manage data consistency between the static random access memory and a data caches of each of the cores, wherein the link is connected between the master interface and the slave interface, wherein the link comprises an A-channel, a B-channel, a C-channel, a D-channel, and an E-channel, the A-channel is configured to transmit an AcquireBlock message compliant with the Tile-Link protocol sent by the master interface to the slave interface, the D-channel is configured to transmit a GrantData message or a Grant message compliant with the TileLink protocol sent by the slave interface to the master interface, the E-channel is configured to transmit a GrantAck message compliant with the TileLink protocol sent by the master interface to the slave interface, the C-channel is configured to transmit a ReleaseData message or a Release message compliant with the TileLink protocol sent by the master interface to the slave interface, the D-channel is further configured to transmit a ReleaseAck message compliant with the TileLink protocol sent by the slave interface to the master interface, the B-channel is configured to transmit a ProbeBlock message or a ProbePerm message compliant with the TileLink protocol sent by the slave interface to the master interface, the C-channel is further configured to transmit a ProbeAckData message or a ProbeAck message compliant with the TileLink protocol sent by the master interface to the slave interface, the A-channel is further configured to transmit a cache management operation message from the master interface to the slave interface, the cache management operation message is configured to manage data consistency between different data caches, and the D-channel is further configured to transmit a cache management operation acknowledgement message of the slave interface to the master interface, and the cache management operation message and the cache management operation acknowledgement message are unstandardized messages to a TileLink specification.

11. The integrated circuit according to claim 10, further comprising:

a first core, configured to execute a cache management operation instruction to manage data consistency between different data caches, wherein the first core sends the cache management operation message from the master interface of the first core to the slave interface of the L2-cache in response to the execution of the cache management operation instruction.

12. The integrated circuit according to claim 11, wherein the cache management operation instruction is configured to perform at least one of a write-back and an invalidation on at least one cache line of each of different data caches of different cores.

13. The integrated circuit according to claim 10, wherein the L2-cache is configured to receive and execute the cache management operation message from a first core, wherein the L2-cache sends the ProbeBlock message or the ProbePerm message to at least one second core in response to the execution of the cache management operation message to manage data consistency between a data cache of the first core and at least one data cache of the at least one second core, the L2-cache receives the ProbeAckData message or the ProbeAck message from the at least one second core, and the L2-cache sends the cache management operation acknowledgement message to the first core, wherein the first core executes a cache management operation instruction, the master interface of a data cache of the first core sends a cache management operation message to the slave interface of the L2-cache through the A-channel, so as to change a permission of a target cache line of the at least one data cache of the at least one second core.

14. The integrated circuit according to claim 13, wherein the cache management operation message is a CMOBlock message, the L2-cache sends the ProbeBlock message to the at least one second core in response to the execution of the cache management operation message.

15. The integrated circuit according to claim 13, wherein the cache management operation message is a CMOPerm message, the L2-cache sends the ProbePerm message to the at least one second core in response to the execution of the cache management operation message.

16. The integrated circuit according to claim 13, wherein an operation category of the cache management operation instruction is a write-back and invalidating operation type.

17. The integrated circuit according to claim 13, wherein an operation category of the cache management operation instruction is an invalidating operation type.

18. The integrated circuit according to claim 13, wherein an operation category of the cache management operation instruction is a write-back operation type.

* * * * *